(12) United States Patent
Sagami et al.

(10) Patent No.: US 11,900,754 B2
(45) Date of Patent: Feb. 13, 2024

(54) PAPER SHEET HANDLING APPARATUS AND CORRECTION METHOD OF PAPER SHEET HANDLING APPARATUS

(71) Applicant: FUJITSU FRONTECH LIMITED, Inagi (JP)

(72) Inventors: Takanori Sagami, Inagi (JP); Yasuyuki Ishihara, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 17/531,347

(22) Filed: Nov. 19, 2021

(65) Prior Publication Data

US 2022/0076521 A1 Mar. 10, 2022

Related U.S. Application Data

(60) Division of application No. 15/922,508, filed on Mar. 15, 2018, now abandoned, which is a continuation of
(Continued)

(51) Int. Cl.
*G07D 7/04* (2016.01)
*G07D 11/50* (2019.01)
(Continued)

(52) U.S. Cl.
CPC ............... *G07D 7/04* (2013.01); *G07D 7/00* (2013.01); *G07D 7/121* (2013.01); *G07D 7/128* (2013.01);
(Continued)

(58) Field of Classification Search
None
See application file for complete search history.

(56) References Cited

U.S. PATENT DOCUMENTS 5,964,336 A 10/1999 Itako et al.
6,105,864 A 8/2000 Shiobara
(Continued)

FOREIGN PATENT DOCUMENTS

CN 101375147 2/2009
JP 9-16826 1/1997
(Continued)

OTHER PUBLICATIONS

Japanese Office Action dated Nov. 20, 2018 in corresponding Japanese Patent Application No. 2017-542624.
(Continued)

*Primary Examiner* — Samah A Beg
(74) *Attorney, Agent, or Firm* — STAAS & HALSEY LLP

(57) ABSTRACT

A method including correcting output of an image sensor unit based on correction information of the image sensor unit that captures and discriminates a paper sheet. A apparatus includes an image sensor unit which includes an image capturing element that captures a banknote so as to discriminate the banknote, a controller that controls the image sensor unit, and a first attachment part, to which the image sensor unit is attached to be detachable, and which includes a connection terminal that connects the image sensor unit and the controller with each other, and which is arranged in a conveyance path for conveying the banknote.

2 Claims, 13 Drawing Sheets

Related U.S. Application Data application No. PCT/JP2015/077843, filed on Sep. 30, 2015.

(51) Int. Cl.
  *G07D 7/00* (2016.01)
  *H04N 1/60* (2006.01)
  *G07D 7/121* (2016.01)
  *G07D 7/128* (2016.01)
  *G07F 7/04* (2006.01)
  *B65H 3/06* (2006.01)
  *G06K 7/08* (2006.01)

(52) U.S. Cl.
  CPC ............... *G07D 11/50* (2019.01); *G07F 7/04* (2013.01); *H04N 1/60* (2013.01); *B65H 3/0638* (2013.01); *B65H 2301/544* (2013.01); *B65H 2701/1912* (2013.01); *G06K 7/087* (2013.01)

(56) References Cited

U.S. PATENT DOCUMENTS

| | | |
|---|---|---|
| 6,170,631 B1 | 1/2001 | Miyazaki |
| 6,700,684 B1 | 3/2004 | Chiba |
| 7,210,346 B1 | 5/2007 | Hoover et al. |
| 9,141,876 B1 | 9/2015 | Jones |
| 9,516,194 B2 * | 12/2016 | Uchida .............. H04N 1/00087 |
| 2006/0137959 A1 | 6/2006 | Iida et al. |
| 2010/0000838 A1 * | 1/2010 | Hamasaki ................ G07D 7/12 194/207 |
| 2014/0168719 A1 | 6/2014 | Miura et al. |
| 2020/0005578 A1 | 1/2020 | Nada |

FOREIGN PATENT DOCUMENTS

| | | |
|---|---|---|
| JP | 10-31774 | 2/1998 |
| JP | 2000-48237 | 2/2000 |
| JP | 2000-67296 | 3/2000 |
| JP | 2006-185076 | 7/2006 |
| JP | 2007-34601 | 2/2007 |
| JP | 2014-64051 | 4/2014 |
| WO | WO 99/35618 A1 | 7/1999 |
| WO | WO 2017/018068 A1 | 2/2017 |

OTHER PUBLICATIONS

Chinese Office Action dated Aug. 28, 2019 in corresponding Chinese Patent Application No. 201580083422.2.
Japanese Office Action dated Jul. 2, 2019 in corresponding Japanese Patent Application No. 2017-542624 (2 pages).
Partial Supplementary European Search Report dated Aug. 14, 2018 in corresponding European Patent Application No. 15905424.6; 9 pages.
International Search Report dated Jan. 12, 2016 in corresponding International Patent Application No. PCT/JP2015/077843.
Written Opinion of the International Searching Authority dated Jan. 12, 2016 in corresponding International Patent Application No. PCT/JP2015/077843.
Restriction Office Action dated May 18, 2020 in parent U.S. Appl. No. 15/922,508 (6 pages).
Non-Final Office Action dated Aug. 20, 2020 in parent U.S. Appl. No. 15/922,508 (43 pages).
Final Office Action dated Dec. 3, 2020 in parent U.S. Appl. No. 15/922,508 (25 pages).
Non-Final Office Action dated Mar. 30, 2021 in parent U.S. Appl. No. 15/922,508 (25 pages).
Final Office Action dated Aug. 27, 2021 in parent U.S. Appl. No. 15/922,508 (27 pages).
U.S. Appl. No. 15/922,508, filed Mar. 15, 2018, Takanori Sagami et al., Fujitsu Frontech Limted, Inagi-shi, Tokyo, JP.

* cited by examiner

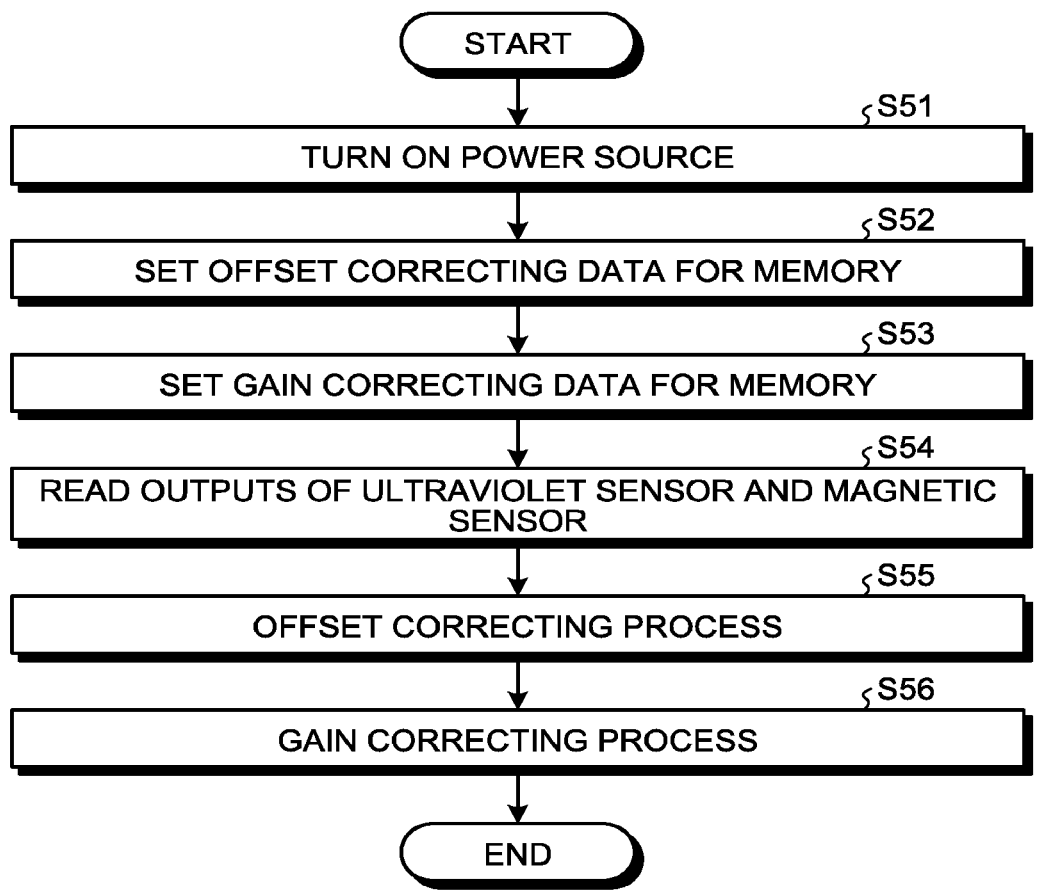

PAPER SHEET HANDLING APPARATUS AND CORRECTION METHOD OF PAPER SHEET HANDLING APPARATUS

CROSS-REFERENCE TO RELATED APPLICATION

This application is a divisional application of U.S. patent application Ser. No. 15/922,508, filed Mar. 15, 2018, which is a continuation application of International Application PCT/JP2015/077843, filed on Sep. 30, 2015 and designating the U.S., the entire contents of which are incorporated herein by reference.

FIELD

The present invention relates to a paper sheet handling apparatus and a correction method of the paper sheet handling apparatus.

BACKGROUND

For example, there is known a banknote handling apparatus used for an automated teller machine (ATM) etc., which includes a discrimination unit that discriminates banknotes. Such a kind of discrimination unit includes a conveyance mechanism for conveying a banknote and discrimination sensors having a plurality of types for discriminating the banknote, which is conveyed by the conveyance mechanism, for example. As the discrimination sensors having the plurality of types, for example, an image sensor for capturing and discriminating a banknote, an ultraviolet sensor for discriminating a fluorescent component of the banknote, and a magnetic sensor for discriminating a magnetic component of the banknote are employed.

There is known, as the discrimination unit, a sensor unit including light emitting elements, light receiving elements, and a magnetic head.

Patent Literature 1: Japanese Laid-open Patent Publication No. 10-031774

Meanwhile, in the above discrimination unit, when maintenance or replacement is to be performed on the image sensor, a work of detaching the image sensor from an inner part of the discrimination unit is complicated, and thus it is difficult to maintain or replace only the image sensor. Hence, in such a case, in the banknote handling apparatus, maintenance or replacement is performed on a whole of the discrimination unit, and thus there exists a problem that the cost for the maintenance or replacement of the image sensor increases.

SUMMARY

According to an aspect of the embodiments, a paper sheet handling machine includes: an image sensor unit which includes an image capturing element that captures a paper sheet so as to discriminate the paper sheet; a controller that controls the image sensor unit; and a first attachment part that includes: a connection terminal that connects the image sensor unit and the controller with each other, the first attachment part, to which the image sensor unit is attached to be detachable, being arranged in a conveyance path for conveying the paper sheet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a flowchart illustrating an output correcting process to be executed by the ultraviolet/magnetic sensor unit according to the embodiment in its reading.

DESCRIPTION OF EMBODIMENTS

Hereinafter, an exemplary embodiment of a paper sheet handling apparatus and a correction method of the paper sheet handling apparatus disclosed in the present application will be described in detail with reference to the accompanying drawings. Moreover, it is not intended that the paper sheet handling apparatus and the correction method of the paper sheet handling apparatus disclosed in the present application be limited to the embodiment described below.

Embodiment

Configuration of Banknote Handling Apparatus

Figure 1:
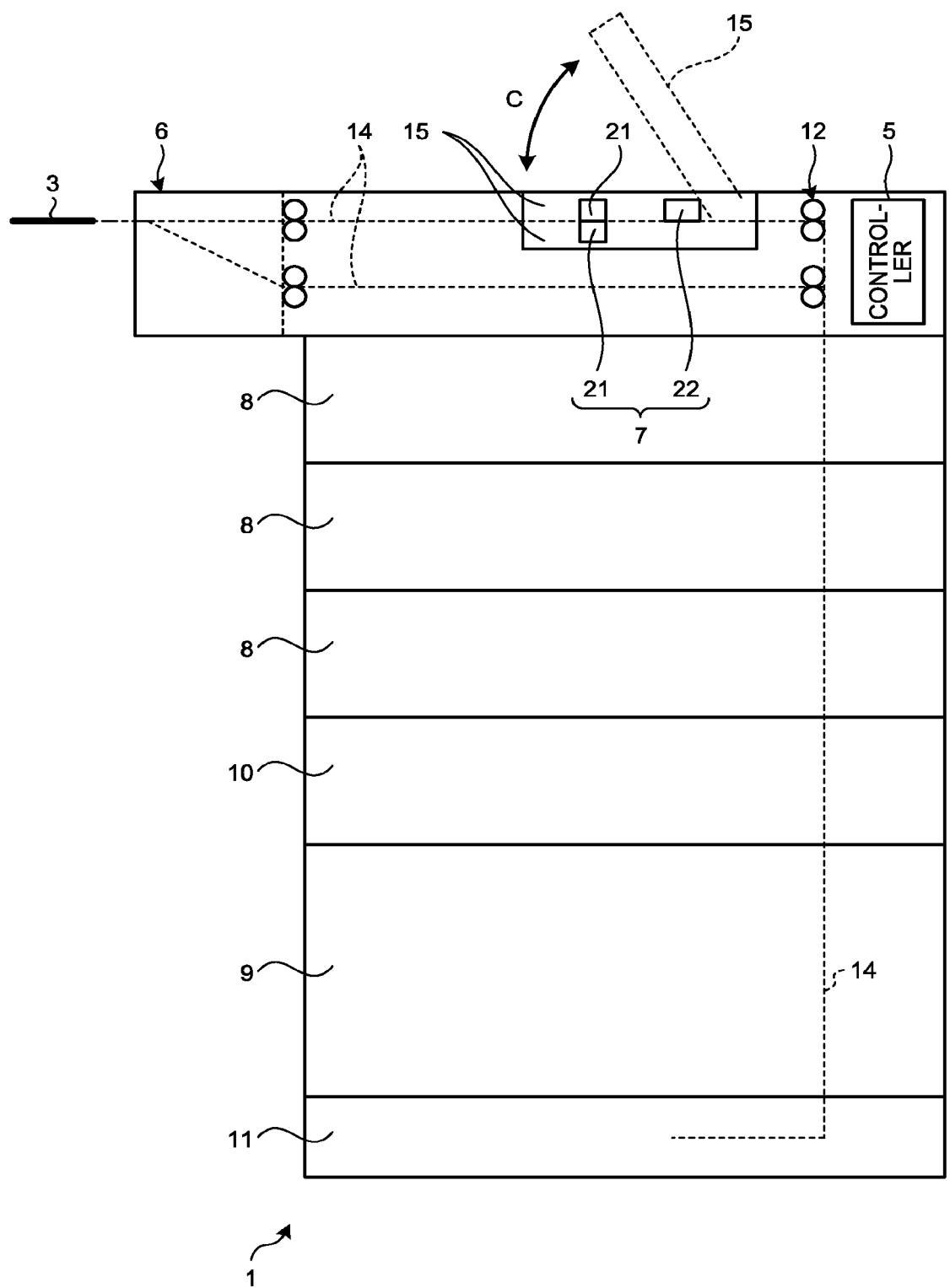
FIG. 1 is a diagram schematically illustrating the whole of a banknote handling apparatus according to an embodiment.

FIG. 1 is a diagram schematically illustrating the whole of the banknote handling apparatus according to the embodiment. As illustrated in FIG. 1, a banknote handling apparatus 1 according to the embodiment includes a bill deposit and withdrawal part 6 that deposits and withdraws a banknote 3, a discriminator 7 that discriminates the banknote 3 deposited in the bill deposit and withdrawal part 6, and a plurality of holding parts 8 that temporarily holds therein the banknote 3 conveyed from the discriminator 7. The banknote handling apparatus 1 further includes a storing part 9 that stores the banknote 3 sent from each of the holding parts 8, a supplying part 10 that supplies the banknote 3 for withdrawal, a retrieving part 11 that retrieves the banknote 3 not flowing back to the bill deposit and withdrawal part 6, and a conveyance mechanism 12 that conveys the banknote 3. These parts 6 to 11 and the conveyance mechanism 12 are controlled by a controller 5. In the present embodiment, the banknote 3 is employed as one example of a paper sheet, not limited to the banknote 3, another paper sheet such as a cash voucher may be used.

Figure 2:
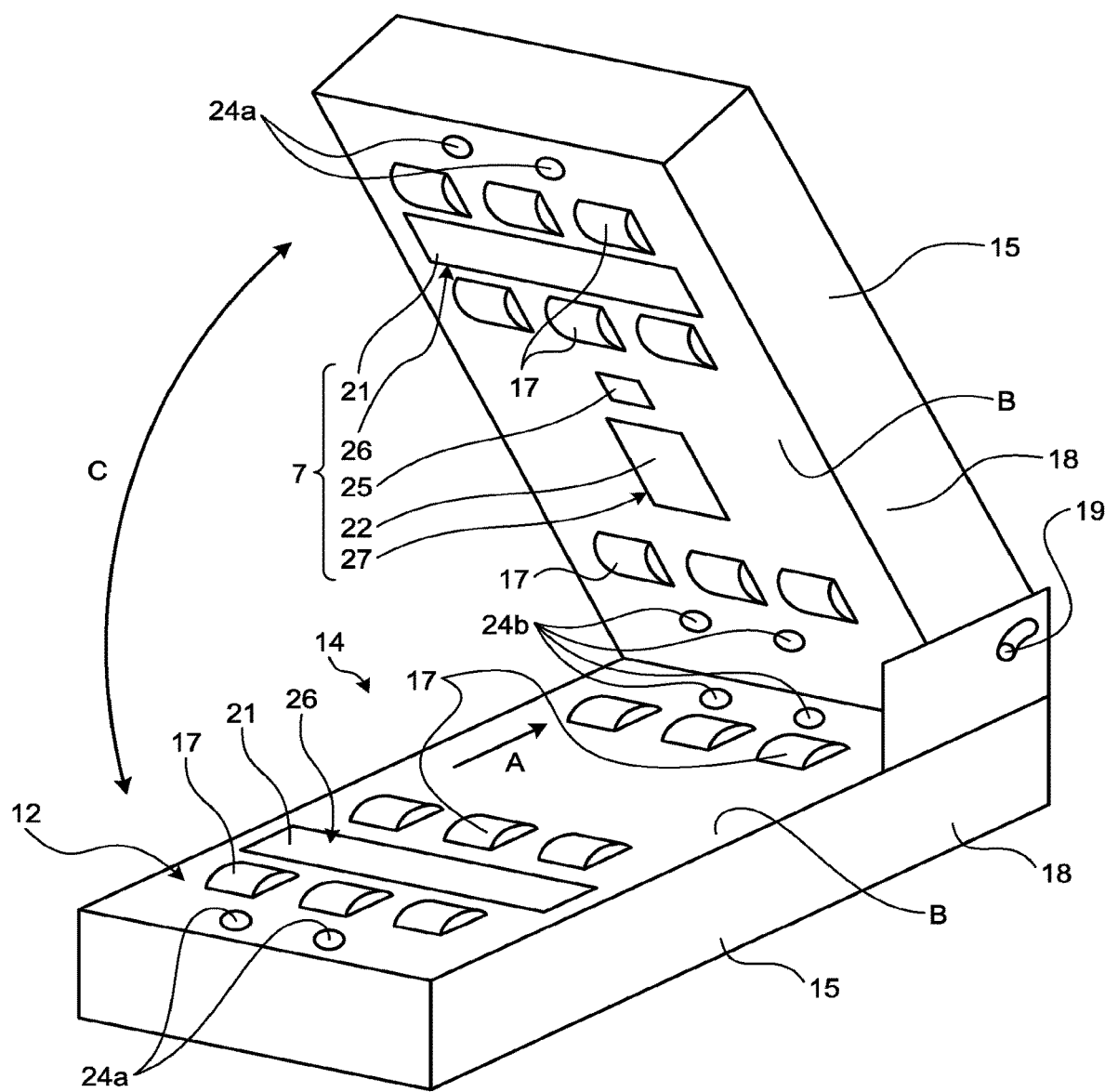
FIG. 2 is a perspective view schematically illustrating a discriminator included in the banknote handling apparatus according to the embodiment.

FIG. 2 a perspective view schematically illustrating the discriminator 7 included in the banknote handling apparatus 1 according to the embodiment. As illustrated in FIGS. 1 and 2, the conveyance mechanism 12 includes a pair of upper and lower conveyance-path constituting bodies 15 constituting a conveyance path 14 of the banknote 3, and the upper conveyance-path constituting body 15 is configured to be dividable, from the lower conveyance-path constituting body 15, on a division surface B which is arranged along a conveyance direction A of the banknote 3.

The conveyance-path constituting body 15 includes a plurality of conveyance rollers 17 that conveys the banknote 3, chassis 18 that supports the plurality of conveyance rollers 17 to be rotatable, and a driving mechanism (not illustrated) that drives the plurality of conveyance rollers 17. The chassis 18 of the upper conveyance-path constituting body 15 is supported to be rotatable around a rotation shaft 19 in a direction C with respect to the chassis 18 of the lower conveyance-path constituting body 15. The plurality of conveyance rollers 17 is arranged along the conveyance path 14 so as to convey the banknote 3 in a state where a short side direction of the rectangular-shaped banknote 3 is in parallel to the conveyance direction A.

Configuration of Discriminator

Figure 3:
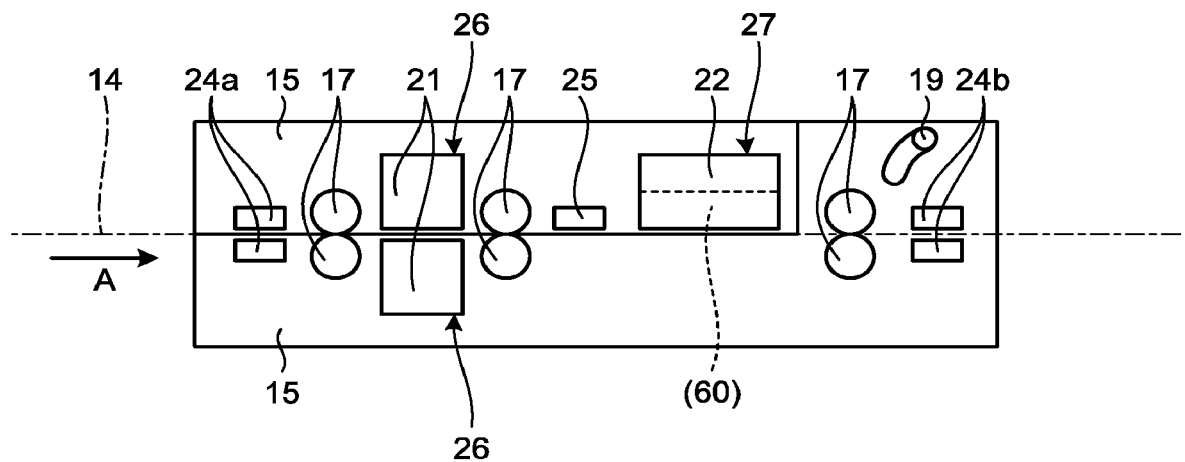
FIG. 3 is a side view schematically illustrating a state where a conveyance path is closed by a conveyance-path constituting bodies of the discriminator according to the embodiment.
Figure 4:
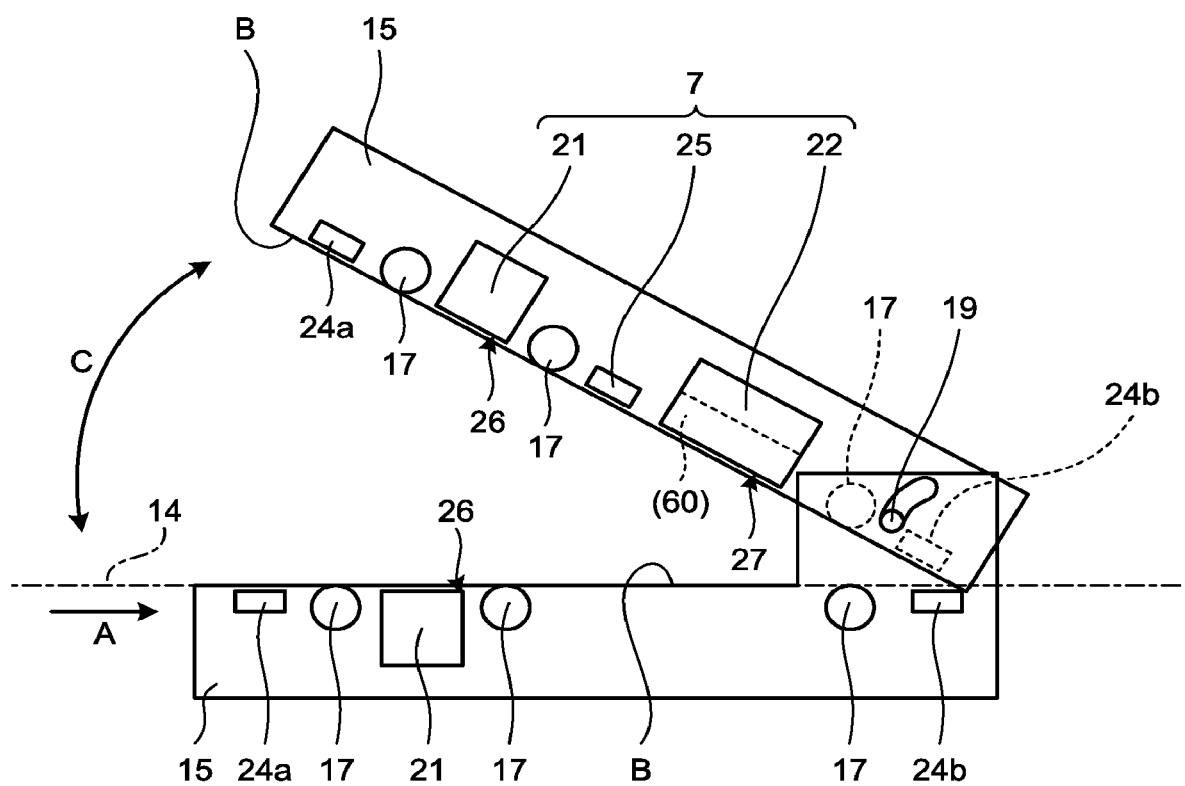
FIG. 4 is a side view schematically illustrating a state where the conveyance path is opened by the conveyance-path constituting bodies of the discriminator according to the embodiment.

FIG. 3 is a side view schematically illustrating a state where the conveyance path 14 is closed by the conveyance-path constituting bodies 15 of the discriminator 7 according to the embodiment. FIG. 4 is a side view schematically illustrating a state where the conveyance path 14 is opened by the conveyance-path constituting bodies 15 of the discriminator 7 according to the embodiment.

As illustrated in FIGS. 2 to 4, the discriminator 7 includes a pair of image sensor units 21 that captures the banknote 3 to perform discrimination, and a pair of first attachment parts 26 to which the respective image sensor units 21 are attached to be detachable. One of the pair of image sensor units 21 discriminates one surface of the banknote 3, and the other of the pair of image sensor units 21 discriminates the other surface of the banknote 3.

The discriminator 7 further includes an ultraviolet/magnetic sensor unit 22 including an ultraviolet sensor and a magnetic sensor, and a second attachment part 27 to which the ultraviolet/magnetic sensor unit 22 is attached to be detachable.

The discriminator 7 further includes entrance sensors 24a as position sensors that detect a position of the banknote 3 entering the discriminator 7, exit sensors 24b as position sensors that detect a position of the banknote 3 exiting from the discriminator 7, and a thickness sensor 25 that detects the thickness of the banknote 3.

Configuration of Image Sensor Unit

Figure 5A:
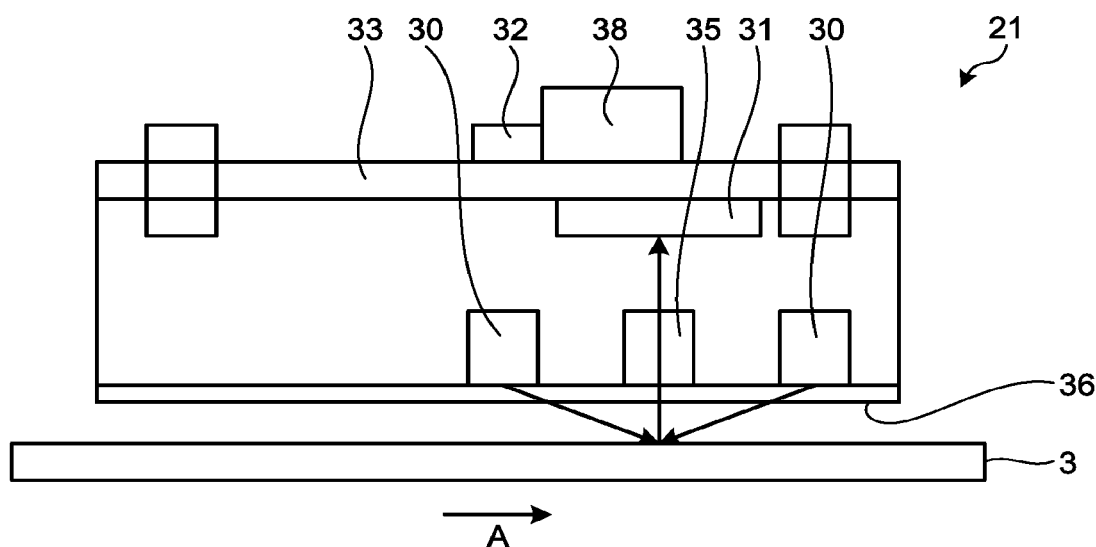
FIG. 5A is a perspective side view illustrating an image sensor unit included in the discriminator according to the embodiment.
Figure 5B:
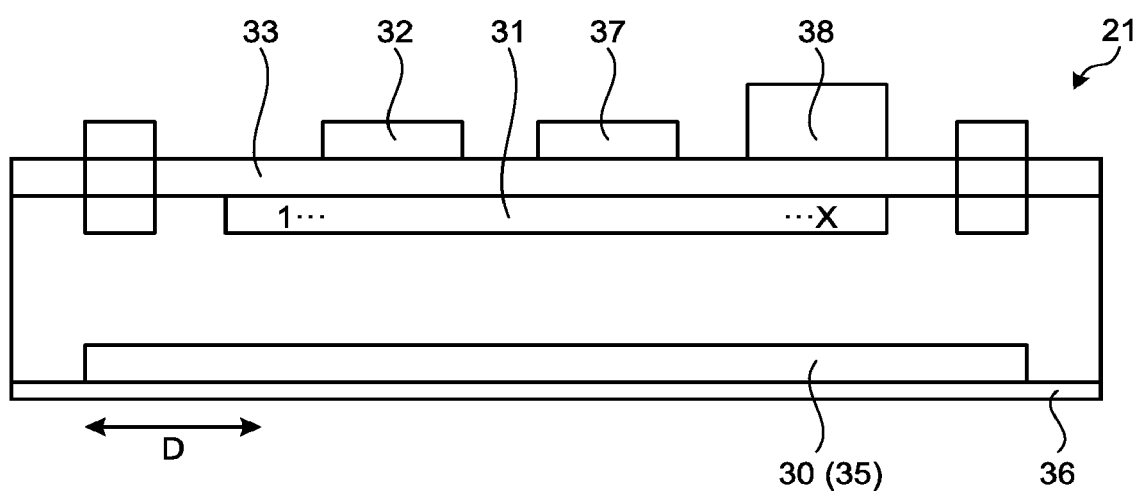
FIG. 5B is a perspective front view illustrating the image sensor unit included in the discriminator according to the embodiment.
Figure 6:
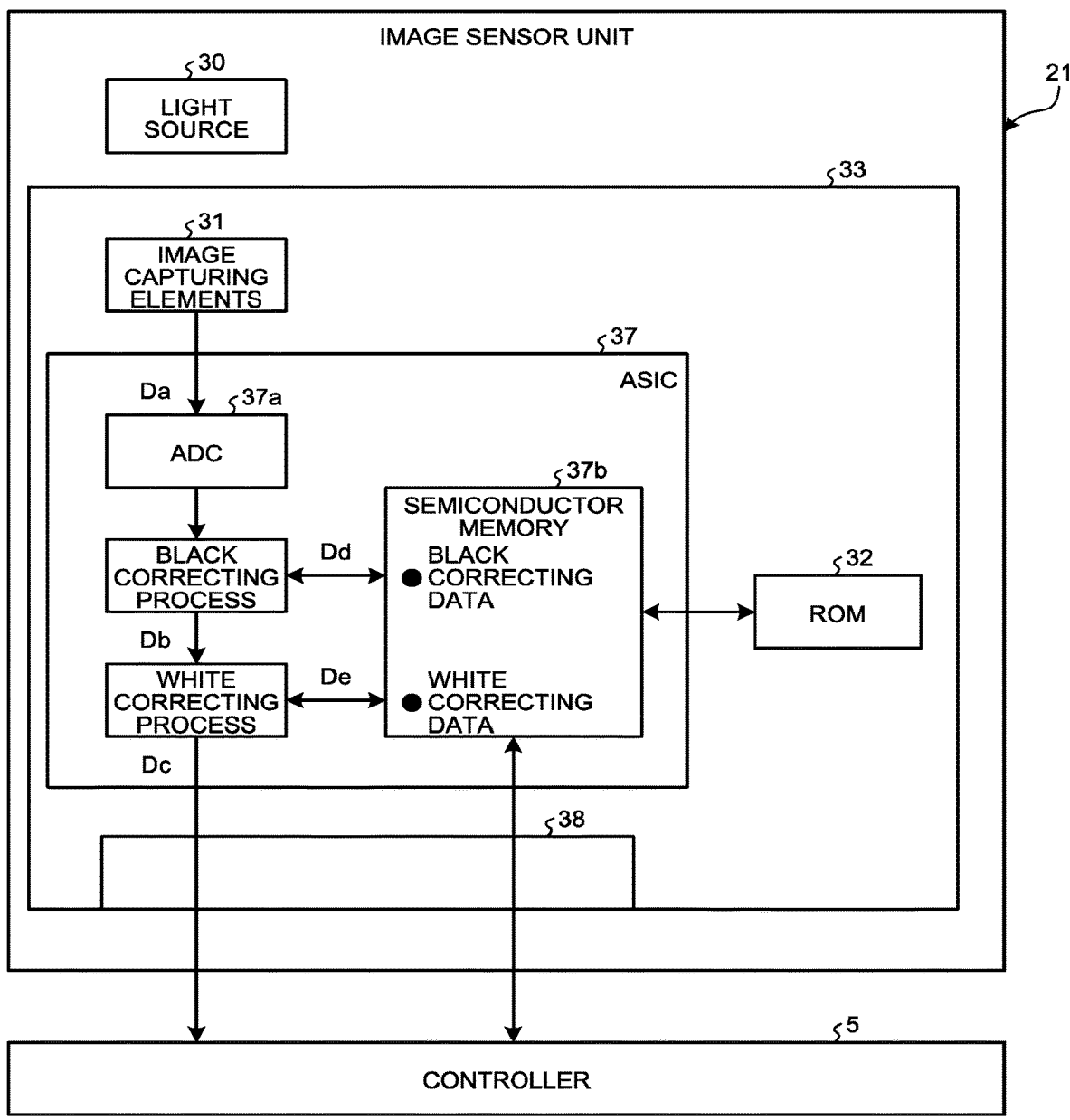
FIG. 6 is a block diagram illustrating the image sensor unit according to the embodiment.

FIG. 5A is a perspective side view illustrating the image sensor unit 21 included in the discriminator 7 according to the embodiment. FIG. 5B is a perspective front view illustrating the image sensor unit 21 included in the discriminator 7 according to the embodiment. FIG. 6 is a block diagram illustrating the image sensor unit 21 according to the embodiment.

As illustrated in FIGS. 5A and 5B, each of the image sensor units 21 includes light sources 30, a plurality of image capturing elements 31, a storage element 32 that stores correction information for correcting outputs from the plurality of image capturing elements 31, and a circuit board 33 on which the plurality of image capturing elements 31 and the storage element 32 are arranged. The image sensor unit 21 is what is called a line sensor unit in which the plurality of first to X-th image capturing elements 31 is arrayed along a straight line perpendicular to the conveyance direction A of the banknote 3.

As illustrated in FIG. 5B, each of the light sources 30 is arranged in a line in an alignment direction D of the plurality of image capturing elements 31, and as illustrated in FIG. 5A, the light sources 30 are arranged so as to place the image capturing elements 31 therebetween in the conveyance direction A of the banknote 3. In an inner part of the image sensor unit 21, a line-shaped lens member 35 is arranged, along the alignment direction D of the plurality of image capturing elements 31, in a position opposite to the plurality of image capturing elements 31. The light sources 30 and the lens member 35 are covered by a cover member 36 that has the optical transparency.

As illustrated in FIG. 6, a Read Only Memory (ROM) is employed as the storage element 32, which stores black correcting data and white correcting data as correction information to be mentioned later. As illustrated in FIG. 6, a custom integrated circuit (custom IC: ASIC) 37 and a connector 38, which is electrically connected with the controller 5, are arranged on the circuit board 33. The custom IC 37 includes an analog/digital converter (ADC) 37a that converts outputs from the image capturing elements 31, and a semiconductor memory 37b in which correction data read from the storage element 32 (ROM) is set.

Figure 7:
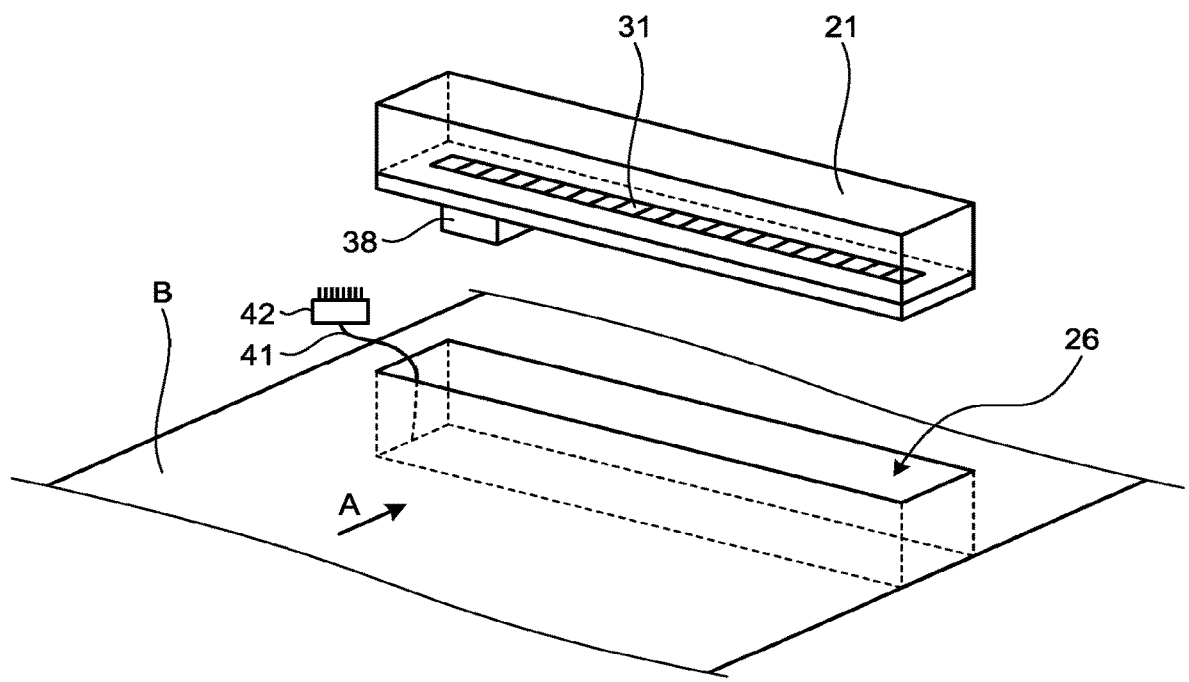
FIG. 7 is a perspective view illustrating a state where the image sensor unit is to be attached to the discriminator according to the embodiment.

FIG. 7 is a perspective view illustrating a state where the image sensor unit 21 is to be attached to the discriminator 7 according to the embodiment. As illustrated in FIGS. 3, 4, and 7, the pair of first attachment parts 26 is arranged in opposite positions in the upper conveyance-path constituting body 15 and the lower conveyance-path constituting body 15, and is formed to open to the division surface B of the conveyance path 14. Thus, when the division surface B of the pair of upper and lower conveyance-path constituting bodies 15 is opened, it is possible to easily access the first attachment parts 26. As illustrated in FIG. 7, each of the first attachment parts 26 is provided with one end of connecting cable 41 electrically connected with the controller 5, and a connection terminal 42 of the connecting cable 41 is to be connected with the connector 38 of the circuit board 33 that is included in the image sensor unit 21.

Each of the first attachment parts 26 includes a plurality of reference surfaces (not illustrated) for positioning the image sensor unit 21 at a predetermined position with reference to the conveyance path 14. The image sensor unit 21, which is attached to the first attachment part 26, is fixed by using a fixing screw and using a fixing member among other things (not illustrated).

Ultraviolet/Magnetic Sensor Unit

Figure 8:
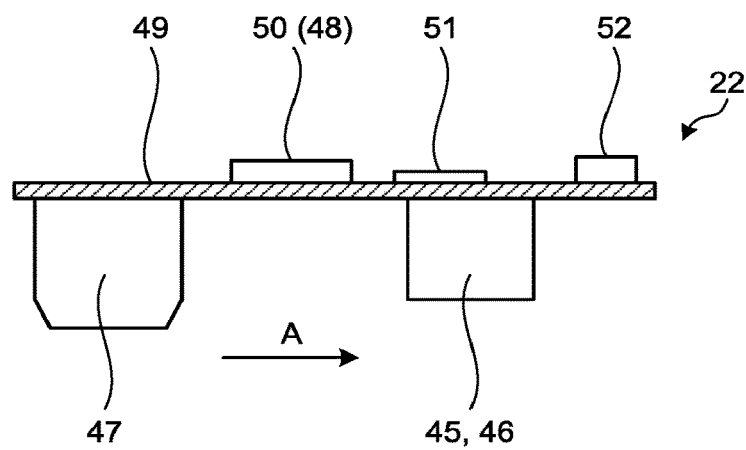
FIG. 8 is a side view illustrating an ultraviolet/magnetic sensor unit included in the discriminator according to the embodiment.
Figure 9:
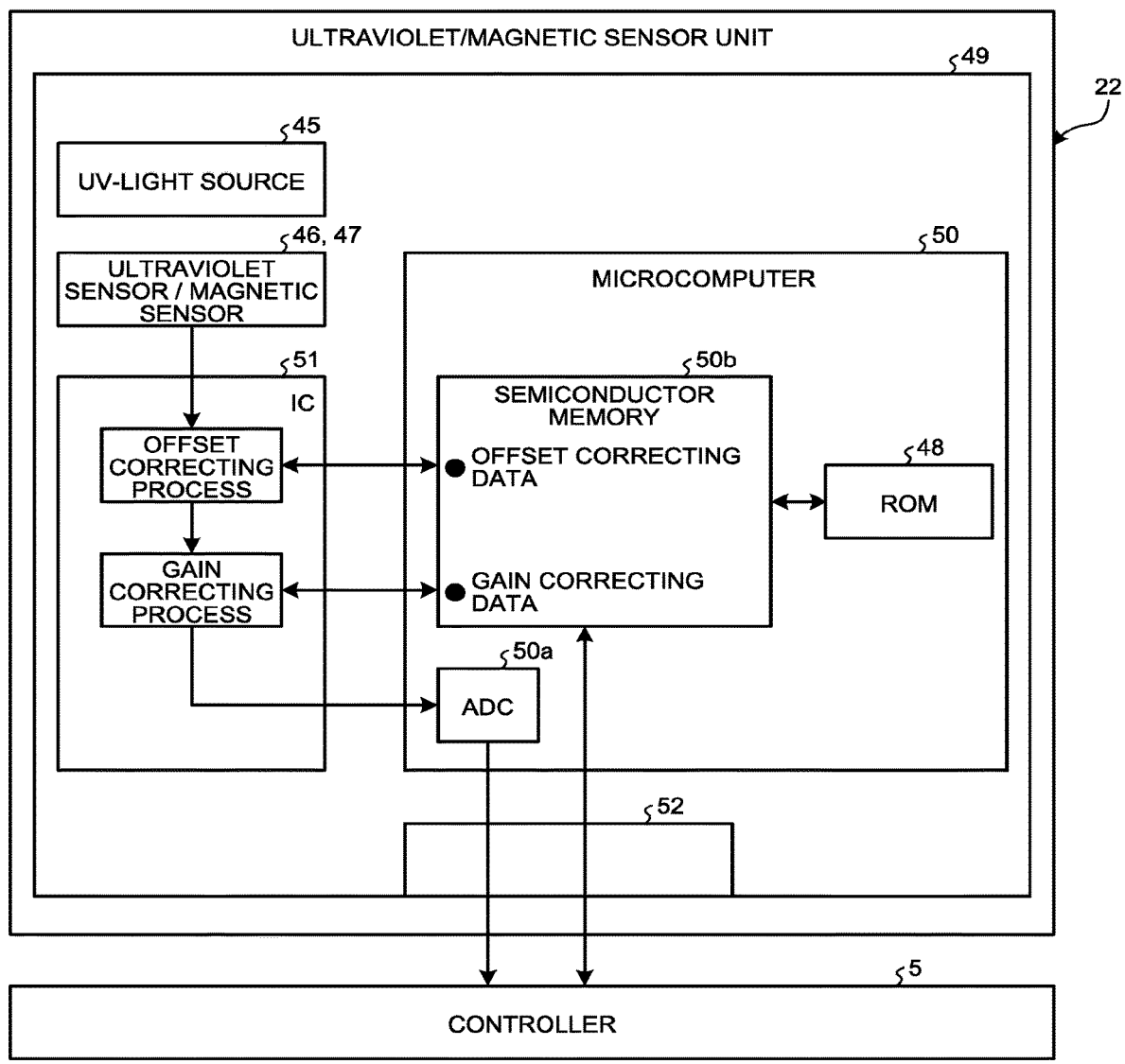
FIG. 9 is a block diagram illustrating the ultraviolet/magnetic sensor unit included in the discriminator according to the embodiment.

FIG. 8 is a side view illustrating the ultraviolet/magnetic sensor unit 22 included in the discriminator 7 according to the embodiment. FIG. 9 is a block diagram illustrating the ultraviolet/magnetic sensor unit 22 included in the discriminator 7 according to the embodiment. As illustrated in FIGS. 8 and 9, the ultraviolet/magnetic sensor unit 22 according to the present embodiment is obtained by integrating an ultraviolet sensor unit and a magnetic sensor unit to be configured as one magneto optical sensor unit.

The ultraviolet/magnetic sensor unit 22 includes a UV-light source 45 that irradiates an ultraviolet ray to the banknote 3, an ultraviolet sensor 46 that discriminates a fluorescent component of the banknote 3, and a magnetic sensor 47 that discriminates a magnetic component (magnetic thread) of the banknote 3. The ultraviolet/magnetic sensor unit 22 further includes a storage element 48 that stores correction information for correcting outputs from the ultraviolet sensor 46 and the magnetic sensor 47, and a circuit board 49 on which the ultraviolet sensor 46, the magnetic sensor 47 and the storage element 48 are arranged.

The ultraviolet sensor 46 and the magnetic sensor 47 are arranged on the circuit board 49 while placing a predetermined interval therebetween in the conveyance direction A of the banknote 3. As illustrated in FIG. 9, a ROM is employed as the storage element 48, which stores offset correcting data and gain correcting data to be mentioned later as the correction information. The ROM as the storage element 48 is included in a microcomputer 50 that is arranged on the circuit board 49.

As illustrated in FIG. 9, an IC 51 that executes a correction process and a connector 52 that is electrically connected with the controller 5, are arranged on the circuit board 33. The microcomputer 50 includes an analog/digital converter 50*a* that converts a correction-processed output, and a semiconductor memory 50*b* in which correction data read from the storage element 48 (ROM) is set.

As illustrated in FIGS. 3 and 4, the second attachment part 27 is arranged on the downstream side of the first attachment parts 26 in the conveyance direction A, and is formed to open to the division surface B of the conveyance path 14. Thus, when the division surface B of the pair of upper and lower conveyance-path constituting bodies 15 is opened, it is possible to easily access the second attachment part 27. Similarly to the configurations of the first attachment parts 26, the second attachment part 27 is provided with one end of a connecting cable (not illustrated) that is electrically connected with the controller 5, and a connection terminal of the connecting cable is to be connected with the connector 52 of the circuit board 49 that is included in the ultraviolet/magnetic sensor unit 22.

The second attachment part 27 includes a plurality of reference surfaces (not illustrated) for positioning the ultraviolet/magnetic sensor unit 22 in a predetermined position with respect to the conveyance path 14. The ultraviolet/magnetic sensor unit 22, which is attached to the second attachment part 27, is fixed by using a fixing screw and a fixing member among other things (not illustrated).

The ultraviolet/magnetic sensor unit 22 according to the present embodiment is obtained by integrating an ultraviolet sensor unit and a magnetic sensor unit so as to be attached to the one second attachment part 27, not limited to this configuration. For example, the ultraviolet sensor unit and the magnetic sensor unit may be separately configured, and the second attachment part 27 attached to the ultraviolet sensor unit and that attached to the magnetic sensor unit, may be individually provided.

In this case of the above configuration, the ultraviolet sensor unit (not illustrated) is configured to include an ultraviolet sensor, a storage element that stores correction information for correcting an output from the ultraviolet sensor, and a circuit board on which the ultraviolet sensor and the storage element are arranged. Similarly, the magnetic sensor unit is configured to include a magnetic sensor, storage element that stores correction information for correcting an output from the magnetic sensor, and a circuit board on which the magnetic sensor and the storage element are arranged.

As illustrated in FIGS. 2 to 4, the entrance sensors 24*a* are arranged on an entrance side in the conveyance direction A of the banknote 3, and include a light emitter that emits a detection light toward the conveyance path 14, and a light receiver that receives the detection light emitted from the light emitter. Similarly, the exit sensors 24*b* are arranged on an exit side in the conveyance direction A of the banknote 3, and include a light emitter that emits a detection light toward the conveyance path 14, and a light receiver that receives the detection light emitted from the light emitter. When the banknote 3 conveyed along the conveyance path 14 blocks the detection light, the entrance sensors 24*a* or the exit sensors 24*b* detect a position (passage of the banknote 3) of the banknote 3.

The thickness sensor 25 is arranged between the image sensor units 21 and the magnetic sensor 47 of the ultraviolet/magnetic sensor unit 22 in the conveyance direction A, for example. The thickness sensor 25 includes a detection plate (not illustrated) provided to be movable in a thickness direction of the banknote 3, and a plane coil (not illustrated) mounted on a printed board. The thickness sensor 25 detects a position of the detection plate, which moves in accordance with the thickness of the banknote 3 in response to a passage of the banknote 3, by using electric current loss so as to detect the thickness of the banknote 3.

Effects of these entrance sensors 24*a*, the exit sensors 24*b*, and the thickness sensor 25, which are influenced on their outputs (discrimination accuracy), caused by attachment states for the conveyance path 14, are large, and thus it is not practical to previously correct the outputs in the sensor alone. In this point, the entrance sensors 24*a*, the exit sensors 24*b*, and the thickness sensor 25 are different from the image sensor units 21, and the ultraviolet sensor 46 and the magnetic sensor 47 of the ultraviolet/magnetic sensor unit 22. Thus, these entrance sensors 24*a*, the exit sensors 24*b*, and the thickness sensor 25 are actually attached to predetermined positions of the conveyance path 14 and then their outputs are individually corrected to adjust their attachment positions as needed.

In other words, unlike the image sensor units 21 and the ultraviolet/magnetic sensor unit 22, the entrance sensors 24*a*, the exit sensors 24*b*, and the thickness sensor are sensors that are difficult to be constituted as sensor units and whose outputs are difficult to be previously corrected in the sensor unit alone.

Output Correction of Image Sensor Unit

Figure 10:
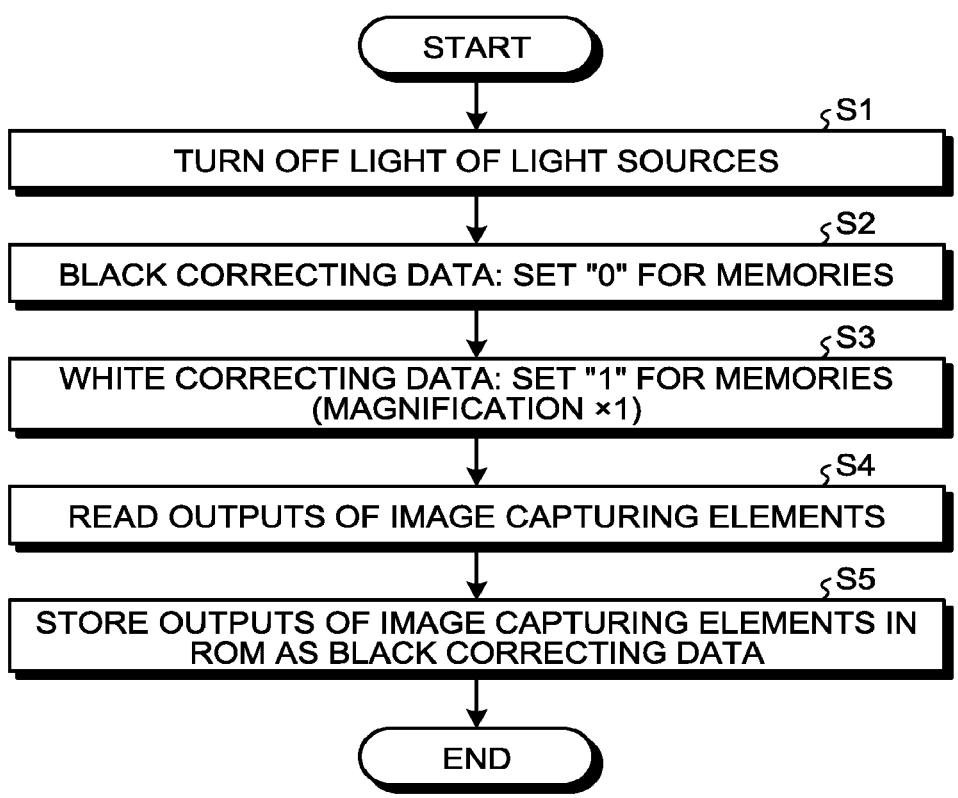
FIG. 10 is a flowchart illustrating a black correction to be performed on each of image capturing elements of the image sensor units according to the embodiment.
Figure 11:
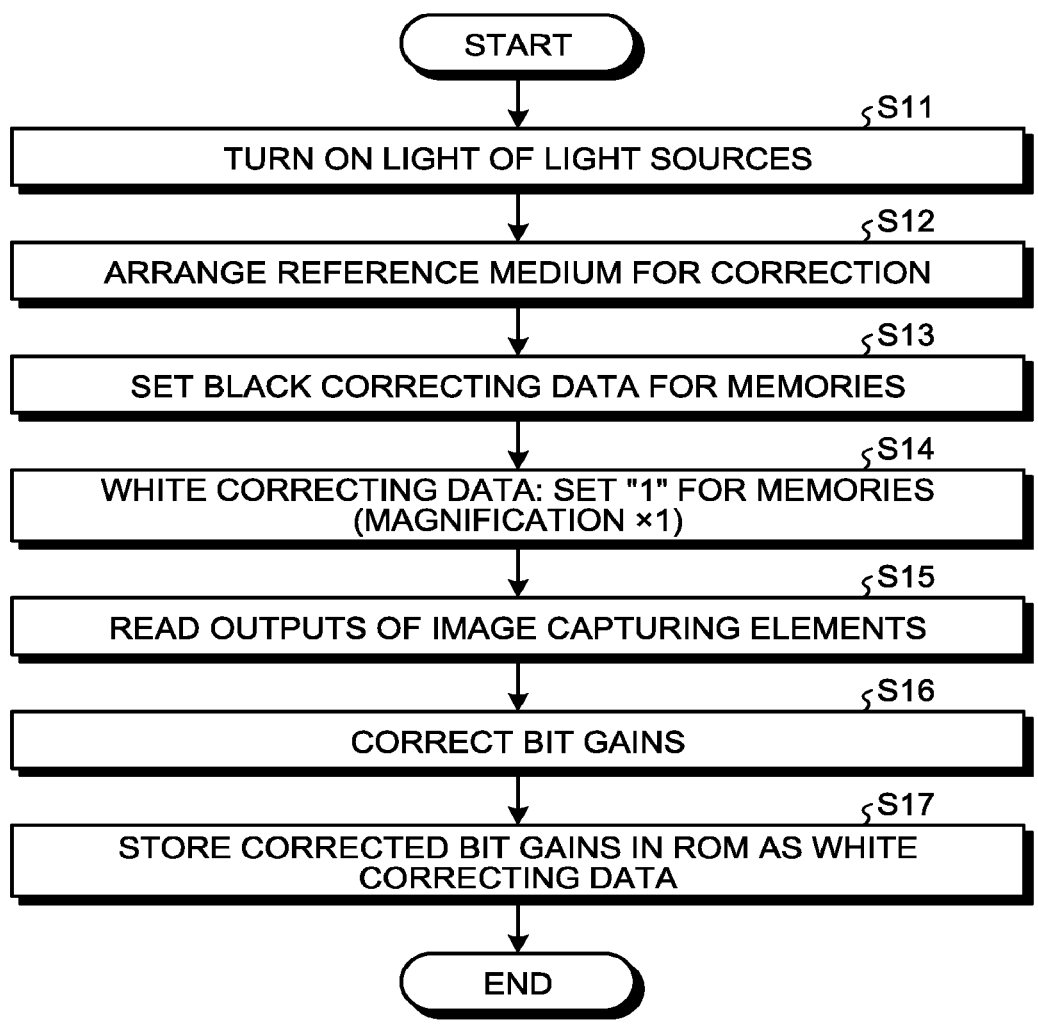
FIG. 11 is a flowchart illustrating a white correction to be performed on each of the image capturing elements of the image sensor units according to the embodiment.
Figure 12:
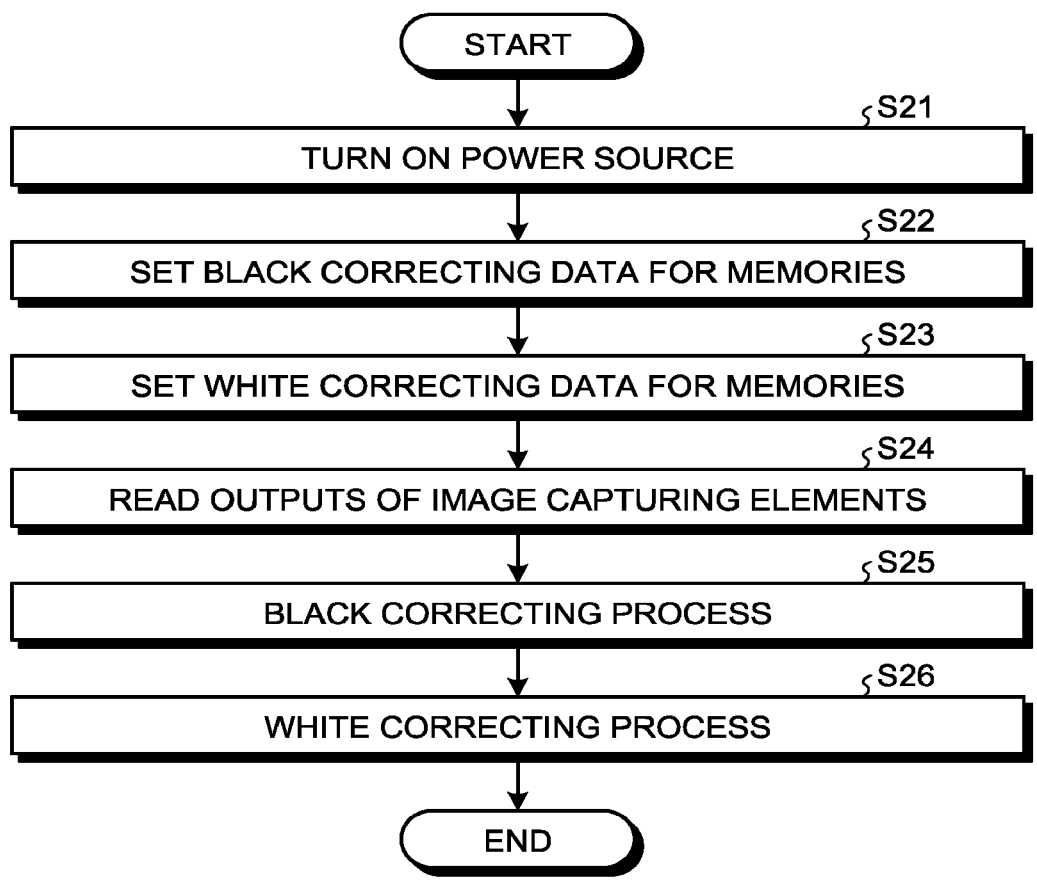
FIG. 12 is a flowchart illustrating an output correcting process to be executed by each of the image sensor units according to the embodiment in its reading.

FIG. 10 is a flowchart illustrating a black correction to be performed on each of the image capturing elements 31 of the image sensor units 21 according to the embodiment. FIG. 11 is a flowchart illustrating a white correction to be performed on each of the image capturing elements 31 of the image sensor units 21 according to the embodiment. FIG. 12 is a flowchart illustrating an output correcting process to be executed by each of the image sensor units 21 according to the embodiment in its reading.

Meanwhile, in a conventional banknote handling apparatus, when an image sensor is maintained or replaced, there exist variations between outputs of the image sensors, and thus a correction work is to be performed on an output of each of the image sensors. Each of the image sensors includes a plurality of image capturing elements and there exists scattering between outputs (sensitivities) of the image capturing elements, and thus correction is performed so as to make the outputs of the plurality of image capturing elements even. Moreover, in the banknote handling apparatus, outputs of a pair of image sensors, that discriminate respective two faces of a banknote, are to be made even. Thus, when the image sensors are maintained or replaced, such an output correcting work is performed on the image sensors after the image sensors are attached to the banknote handling apparatus, and thus the maintenance and replacement of the image sensors are complicated.

On the other hand, a black correction and a white correction are performed on each of the image sensor units 21 according to the embodiment, in the image sensor unit 21 alone, on shipping in a manufacturing process of the image sensor units 21, and their outputs are previously corrected to be appropriate. The black correction indicates an offset correction performed during a non-lighting period of the light source 30 of the image sensor unit 21. Each of the image capturing elements 31 of the image sensor unit 21 generates an output even when the light source 30 is in a non-lighting state, and thus the black correction is to be performed. The white correction indicates an output correction of each of the image capturing elements 31, which is performed by using a reference output correcting medium corresponding to the banknote 3, during a lighting period of the light source 30 of the image sensor unit 21, and a shading correction for making outputs of the image capturing elements 31 even.

The image sensor units 21 are attached to an output correcting jig (not illustrated) and the black correction and the white correction are performed. First, as illustrated in FIG. 10, the output correcting jig turns off the light of the light sources 30 of the pair of image sensor units 21 (Step S1), and performs the black correction on the image sensor units 21. The output correcting jig sets "0" (reference value) as the black correcting data for the semiconductor memories 37b in the image sensor units 21 in order to perform the black correction (Step S2), and sets "1" (magnification) as the white correcting data for the semiconductor memories 37b (Step S3). Next, the output correcting jig reads outputs of the image capturing elements 31 in a non-lighting state of the light sources 30 (Step S4), and stores the outputs (offset amount for "0" as reference value) of the image capturing elements 31 in the storage element 32 (ROM) as the black correcting data (Step S5).

Next, as illustrated in FIG. 11, the output correcting jig turns on the light of the light sources 30 of the pair of image sensor units 21 (Step S11), arranges the reference medium (not illustrated) for correcting output between the pair of image sensor units 21 (Step S12) so as to perform the white correction on the image sensor units 21. The output correcting jig sets the black correcting data obtained in the above black correction for the semiconductor memories 37b in the image sensor units 21 in order to perform the white correction (Step S13), and sets "1" (magnification) for the semiconductor memories 37b as the white correcting data (Step S14). Next, the output correcting jig reads outputs of the image capturing elements 31 in a lighting state of the light sources 30 (Step S15).

The output correcting jig corrects magnifications (bit gains) for respective outputs of the image capturing elements 31 on the basis of the outputs of the image capturing elements 31 with respect to the plurality of image capturing elements 31 that are included in the image sensor units 21 (Step S16). For example, in a case where a target value of the outputs of the image capturing elements 31 is "100", when a measurement value of one of the output of the image capturing elements 31 is "80", the bit gain of the corresponding one of the image capturing elements 31 is corrected to (100/80)=1.25 times. In other words, the output correcting jig corrects the bit gain for each of the image capturing elements 31 so that the outputs of the image capturing elements 31 become the target value to be made even. The corrected bit gains, which are obtained by correcting the bit gains of the image capturing elements 31, are stored in the storage element 32 (ROM) as the white correcting data (Step S17).

As described above, the black correction and the white correction are previously performed, it is accordingly possible to obtain appropriate outputs without performing the black correction and the white correction after the image sensor units 21 are attached to the first attachment parts 26 of the banknote handling apparatus 1. Specifically, in the banknote handling apparatus 1, an output correcting process is executed, when the image sensor units 21 are used, by using the black correcting data and the white correcting data that are stored in the storage element 32. The output correcting process will be explained.

As illustrated in FIG. 12, a power source of the banknote handling apparatus 1, in which the image sensor units 21 are attached to the first attachment parts 26, is turned on (Step S21). After the turn-on of the power source, the image sensor units 21 automatically set the black correcting data, which is stored in the storage element 32 (ROM), for the semiconductor memories 37b (Step S22), and further automatically set the white correcting data, which is stored in the storage element 32, for the semiconductor memories 37b (Step S23). Subsequently, the banknote handling apparatus 1 turns on the light of the light sources 30 of the image sensor units 21, and captures the conveyed banknote 3 so as to read outputs of the image capturing elements 31 (Step S24). In the banknote handling apparatus 1, the image sensor units 21 execute a black correcting process using the black correcting data on the outputs of the image capturing elements 31 (Step S25), and further execute a white correcting process using the white correcting data on the outputs of the image capturing elements 31 (Step S26).

In the black correcting process, as illustrated in FIG. 6, let an output of each of the image capturing elements 31 after the black correcting process be "db", let an output of the corresponding image capturing element 31 before the black correcting process be "Da", and let a corresponding piece of the black correcting data be "Dd", the following formula 1 is established.

$$db = Da - Dd \quad \text{formula 1}$$

In the white correcting process, let an output of each of the image capturing elements 31 after the white correcting process be "Dc", and let a corresponding piece of the white correcting data be "De", the following formula 2 is established.

$$Dc = db \times De \quad \text{formula 2}$$

Therefore, from the formulae 1 and 2, an output (output after white correction) of each of the image capturing elements 31 satisfies the following formula 3.

$$Dc=(Da-Dd)\times De \quad \text{formula 3}$$

In this manner, in the banknote handling apparatus 1, the image sensor units 21 execute therein, on an output of each of the image capturing elements 31, the black correcting process and the white correcting process by using the black correcting data and the white correcting data that are held by the image sensor units 21 themselves. Thus, it is possible to obtain appropriate outputs without performing the black correction and the white correction on the image sensor units 21 after attachment of the image sensor units 21 to the first attachment parts 26. Thus, the compatibility associated with the outputs is ensured in the image sensor unit 21 alone, so that it is possible to realize easy maintenance and replacement of the image sensor unit 21 in units of the image sensor unit 21.

Output Correction of Ultraviolet/Magnetic Sensor Unit

Figure 13:
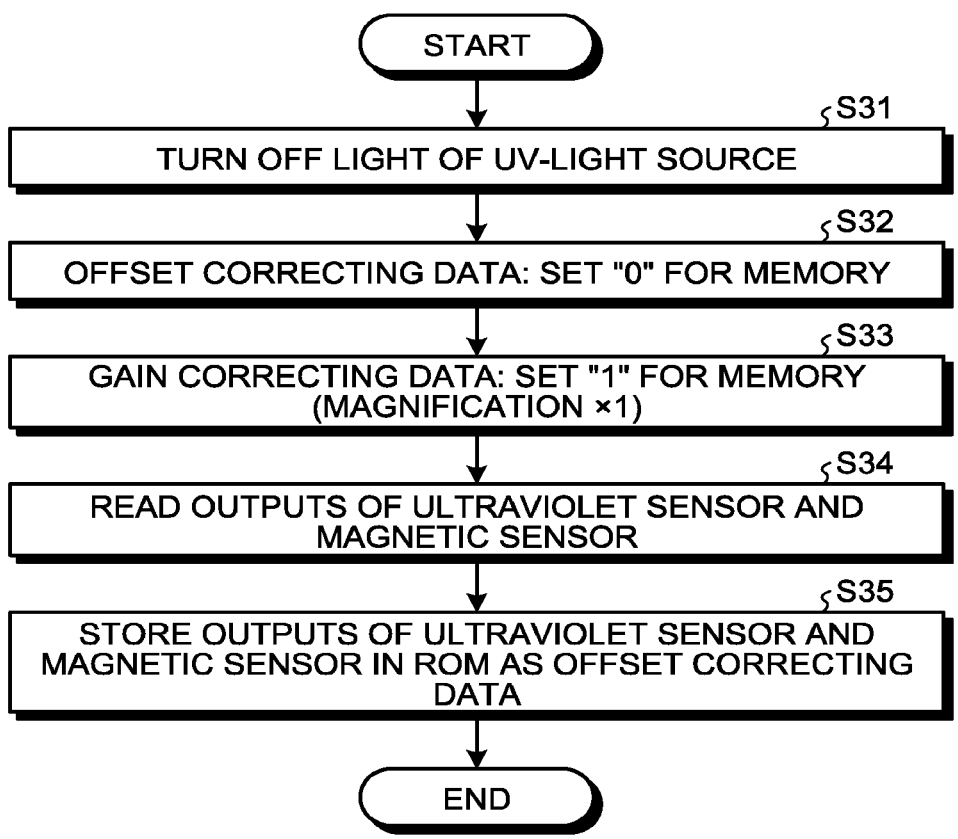
FIG. 13 is a flowchart illustrating an offset correction to be performed on the ultraviolet/magnetic sensor unit according to the embodiment.
Figure 14:
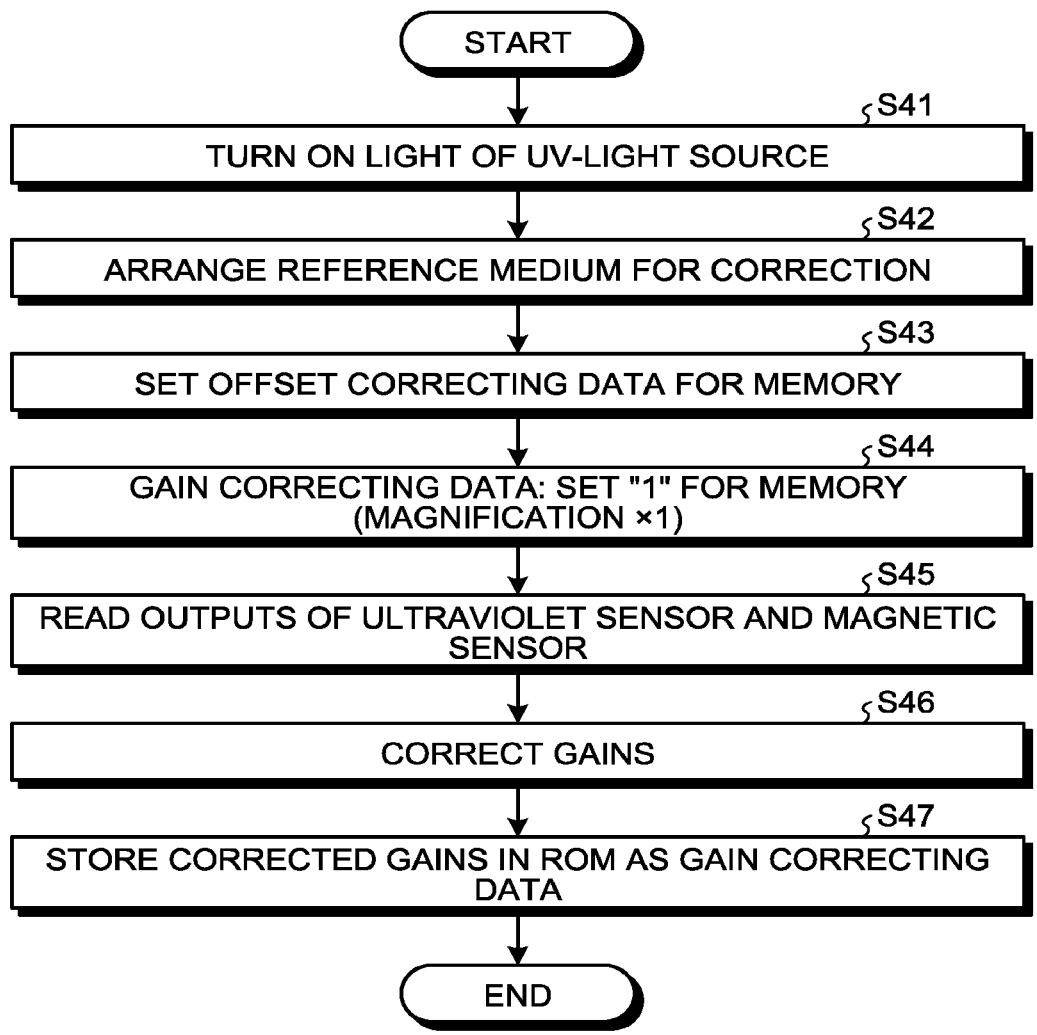
FIG. 14 is a flowchart illustrating a gain correction to be performed on the ultraviolet/magnetic sensor unit according to the embodiment.

FIG. 13 is a flowchart illustrating an offset correction to be performed on the ultraviolet/magnetic sensor unit 22 according to the embodiment. FIG. 14 is a flowchart illustrating a gain correction to be performed on the ultraviolet/magnetic sensor unit 22 according to the embodiment. FIG. 15 is a flowchart illustrating the output correcting process to be executed by the ultraviolet/magnetic sensor unit 22 according to the embodiment in its reading.

Similarly to the image sensor units 21, an offset correction and a gain correction are performed on the above ultraviolet/magnetic sensor unit 22, in the ultraviolet/magnetic sensor unit 22 alone, on shipping of the ultraviolet/magnetic sensor unit 22, and its output (sensitivity) is previously corrected to be appropriate. In the corrections of the ultraviolet/magnetic sensor unit 22, the offset correction corresponds to the black correction in the image sensor units 21, and the gain correction corresponds to the white correction in the image sensor units 21.

The ultraviolet/magnetic sensor unit 22 is attached to an output correcting jig, and the offset correction and the gain correction are performed. First, as illustrated in FIG. 13, the output correcting jig turns off the light of the UV-light source 45 of the ultraviolet/magnetic sensor unit 22 (Step S31), and performs the offset correction on the ultraviolet/magnetic sensor unit 22. The output correcting jig sets, as offset correcting data, "0" (reference value) for the semiconductor memory 50*b* in the ultraviolet/magnetic sensor unit 22 in order to perform the offset correction (Step S32), and further sets, as gain correcting data, "1" (magnification) for the semiconductor memory 50*b* (Step S33). Next, the output correcting jig reads outputs of the ultraviolet sensor 46 and the magnetic sensor 47 in a non-lighting state of the UV-light source 45 (Step S34), and stores the outputs (offset amounts from "0" of reference value) of the ultraviolet sensor 46 and the magnetic sensor 47 in the storage element 48 (ROM) as the offset correcting data (Step S35).

Next, as illustrated in FIG. 14, the output correcting jig turns on the light of the UV-light source 45 of the ultraviolet/magnetic sensor unit 22 (Step S41), and arranges an output correcting reference medium in a predetermined position (Step S42) so as to perform the gain correction on the ultraviolet/magnetic sensor unit 22. The output correcting jig sets the offset correcting data obtained in the above offset correction for the semiconductor memory 50*b* in the ultraviolet/magnetic sensor unit 22 in order to perform the gain correction (Step S43), and further sets "1" (magnification) for the semiconductor memory 50*b* as the gain correcting data (Step S44). Subsequently, the output correcting jig reads outputs of the ultraviolet sensor 46 and the magnetic sensor 47 in a lighting state of the UV-light source 45 (Step S45).

The output correcting jig corrects magnifications for the outputs of the ultraviolet sensor 46 and the magnetic sensor 47 on the basis of the outputs of the ultraviolet sensor 46 and the magnetic sensor 47 (Step S46). The output correcting jig stores corrected gains, which are obtained by correcting gains of the ultraviolet sensor 46 and the magnetic sensor 47, in the storage element 48 (ROM) as the gain correcting data (Step S47).

As described above, the offset correction and the gain correction are previously performed so as to obtain appropriate outputs without performing the offset correction and the gain correction after the ultraviolet/magnetic sensor unit 22 is attached to the second attachment part 27 of the banknote handling apparatus 1. Specifically, the ultraviolet/magnetic sensor unit 22 performs the output correcting process by using the offset correcting data and the gain correcting data, which are stored in the storage element 48, when the ultraviolet/magnetic sensor unit 22 is used in the banknote handling apparatus 1. The output correcting process will be explained.

As illustrated in FIG. 15, the power source of the banknote handling apparatus 1 is turned on, in which the ultraviolet/magnetic sensor unit 22 is attached to the second attachment part 27 (Step S51). After the turn-on of the power source, the banknote handling apparatus 1 automatically sets the offset correcting data, which are stored in the storage element 48 (ROM), for the semiconductor memory 50*b* (Step S52), and further automatically sets the gain correcting data, which are stored in the storage element 48, for the semiconductor memory 50*b* (Step S53). Subsequently, the banknote handling apparatus 1 turns on the light of the UV-light source 45 and discriminates the conveyed banknote 3 so as to read outputs of the ultraviolet sensor 46 and the magnetic sensor 47 (Step S54). In the banknote handling apparatus 1, the ultraviolet/magnetic sensor unit 22 executes an offset correcting process using the offset correcting data on values of the outputs of the ultraviolet sensor 46 and the magnetic sensor 47 (Step S55), and further executes the gain correcting process using the gain correcting data (Step S56).

In the banknote handling apparatus 1, the ultraviolet/magnetic sensor unit 22 executes therein, on an output of each of the ultraviolet sensor 46 and the magnetic sensor 47, the offset correcting process and the gain correcting process by using the offset correcting data and the gain correcting data that are held by the ultraviolet/magnetic sensor unit 22 itself. Thus, the banknote handling apparatus 1 is able to obtain an appropriate output by using the ultraviolet sensor 46 and the magnetic sensor 47 without performing a correction work after attachment of the second attachment part 27 to the ultraviolet/magnetic sensor unit 22. Thus, the compatibility associated with the output is ensured in the ultraviolet/magnetic sensor unit 22 alone, so that it is possible to realize easy maintenance and replacement of the ultraviolet/magnetic sensor unit 22 in units of the ultraviolet/magnetic sensor unit 22.

Replacement Work of Each Sensor Unit in Banknote Handling Apparatus

In the discriminator 7 of the banknote handling apparatus 1, the image sensor unit 21 is detached from the first attachment part 26 when the image sensor unit 21 is maintained or replaced. The image sensor units 21, in which the black correcting data and the white correcting data are previously stored, are attached to the first attachment part 26. When the image sensor unit 21 is attached to the first attachment part 26, the connector 38 of the circuit board 33 is connected to the connection terminal 42 of the connecting cable 41 so that the image sensor unit 21 is controlled by the controller 5.

As described above, each of the image sensor units 21, which is attached to the corresponding first attachment parts 26, includes the black correcting data and the white correcting data that is stored in the storage element 32, so that it is possible to correct outputs by the image sensor unit 21 alone. Therefore, the discriminator 7 is not to correct outputs of the image sensor units 21 in a maintenance or replacement of the image sensor units 21. The discriminator 7 is able to discriminate the banknote 3 by using the image sensor units 21 whose outputs are corrected to be appropriate, only by attaching the image sensor units 21 to the first attachment parts 26. When a maintenance or replacement is performed on the image sensor units 21, it is preferable that the maintenance or replacement is performed in units of the pair of image sensor units 21, on which the black correction and the white correction are performed on shipping.

Similarly to the case of the image sensor units 21, when a maintenance or replacement is performed on the ultraviolet/magnetic sensor unit 22, the ultraviolet/magnetic sensor unit 22 is detached from the second attachment part 27. The ultraviolet/magnetic sensor unit 22, in which the offset correcting data and the gain correcting data are previously stored, is attached to the second attachment part 27. When the ultraviolet/magnetic sensor unit 22 is attached to the second attachment part 27, the connector 52 of the circuit board 49 is connected to a connection terminal of a connecting cable (not illustrated), and the ultraviolet/magnetic sensor unit 22 is controlled by the controller 5.

As described above, the ultraviolet/magnetic sensor unit 22, which is attached to the second attachment part 27, includes the offset correcting data and the gain correcting data that is stored in the storage element 32, and its output is able to be corrected by the ultraviolet/magnetic sensor unit 22 alone. Therefore, the discriminator 7 is not to correct an output of the ultraviolet/magnetic sensor unit 22 when the ultraviolet/magnetic sensor unit 22 is maintained or replaced. The discriminator 7 is able to discriminate the banknote 3 by using the ultraviolet/magnetic sensor unit 22 whose output is corrected to be appropriate only by attaching the ultraviolet/magnetic sensor unit 22 to the second attachment part 27.

It may be configured so as to include the two second attachment parts, to which an ultraviolet sensor unit and a magnetic sensor unit are individually attached, and the ultraviolet sensor unit and the magnetic sensor unit are selectively attached to the second attachment parts, for example, in accordance with a spec of the banknote 3 to be discriminated. Specifically, a spec of the banknote is different from one country to another, and thus there exists a case where the ultraviolet sensor and/or the magnetic sensor are not needed. Thus, it may be configured so that an ultraviolet sensor or a magnetic sensor is able to be selectively and additionally provided when the ultraviolet sensor or the magnetic sensor becomes needed. In this manner, when the banknote handling apparatus 1 is configured so as to include no ultraviolet sensor and no magnetic sensor, it is possible to reduce the manufacturing cost of the banknote handling apparatus 1 on shipping, and is further possible to upgrade the sensor unit in a field (on the spot).

In this case, a dummy member 60 instead of the ultraviolet sensor unit and the magnetic sensor unit, is attached to be detachable to the second attachment part 27 as indicated by using dashed lines illustrated in FIGS. 3 and 4 so that the dummy member 60 blocks an opening of the second attachment part 27. Such a kind of the dummy member is attached thereto, the stability of a conveyance operation of the banknote 3 is ensured similarly to the state where the ultraviolet sensor unit and the magnetic sensor unit are attached. In a case where the ultraviolet sensor unit and the magnetic sensor unit are to be attached to the second attachment part 27, when the dummy member 60 is detached from the second attachment part 27, the ultraviolet sensor unit and the magnetic sensor unit are able to be easily attached to the second attachment part 27.

The correction method of the banknote handling apparatus configured as described above includes correcting outputs of the image capturing elements 31 of the image sensor units 21, on the basis of the black correcting data and the white correcting data which are stored in the storage element 32 of the image sensor units 21 that capture and discriminate the banknote 3.

Moreover, the correction method of the banknote handling apparatus further includes correcting, on the basis of the offset correcting data and the gain correcting data which are stored in a storage element of at least one sensor unit of the ultraviolet sensor unit and the magnetic sensor unit, an output of the one sensor unit of the ultraviolet sensor or the magnetic sensor.

The banknote handling apparatus 1 according to the embodiment includes the image sensor unit 21, and the first attachment part 26, to which the image sensor unit 21 is attached to be detachable, and which is arranged in the conveyance path 14 for conveying the banknote 3. Thus, when the image sensor unit 21 is attached to or detached from the first attachment part 26, it is possible to easily maintain or replace the image sensor unit 21 in units of the image sensor unit 21.

The image sensor unit 21 according to the banknote handling apparatus 1 includes the storage element 32 that stores the black correcting data and the white correcting data for correcting outputs of the plurality of image capturing elements 31, and the circuit board 33 on which the plurality of image capturing elements 31 and the storage element 32 are arranged. Thus, the image sensor units 21 executes a correction process by using the black correcting data and the white correcting data to be able to obtain appropriate outputs, so that it is possible to easily maintain or replace the image sensor unit 21 in units of the image sensor unit 21. It is accordingly possible to reduce the cost of the maintenance and replacement.

The banknote handling apparatus 1 includes the ultraviolet/magnetic sensor unit 22, and the second attachment part 27, to which the ultraviolet/magnetic sensor unit 22 is attached to be detachable, and which is arranged in the conveyance path 14. Thus, when the ultraviolet/magnetic sensor unit 22 is attached to or detached from the second attachment part 27, it is possible to easily maintain or replace the ultraviolet/magnetic sensor unit 22 in units of the ultraviolet/magnetic sensor unit 22.

The ultraviolet/magnetic sensor unit 22 includes the storage element 48 that stores the offset correcting data and the gain correcting data, and the circuit board 49 on which the ultraviolet sensor 46, the magnetic sensor 47 and the storage element 48 are arranged. Hence, the ultraviolet/magnetic sensor unit 22 executes a correction process by using the offset correcting data and the gain correcting data to be able to obtain an appropriate output, it is accordingly possible to easily maintain or replace the ultraviolet/magnetic sensor unit 22 in units of the ultraviolet/magnetic sensor unit 22.

To the second attachment part 27, the dummy member 60 is attached to be detachable instead of the ultraviolet/magnetic sensor unit 22. Hence, an ultraviolet sensor unit or a magnetic sensor unit is able to be easily and additionally provided in accordance with a spec of the banknote 3 to be discriminated, so that it is possible to easily respond to the spec of the banknote 3 to be discriminated. Additionally, by the omission of the ultraviolet/magnetic sensor unit 22, it is not only possible to reduce the manufacturing cost of the banknote handling apparatus 1 on shipping, and it is also possible to upgrade the sensor unit in a field (on the spot).

The first attachment part 26 according to the banknote handling apparatus 1, is arranged so as to have an opening part on the division surface B of the pair of conveyance-path constituting bodies 15 that are configured to be dividable from the division surface B which is arranged along a conveyance direction of the banknote 3. Hence, when the division surface B of the pair of upper and lower conveyance-path constituting bodies 15 is opened, the first attachment part 26 is able to be easily accessed, so that it is possible to improve a maintenance property and a replacement property of the image sensor unit 21.

According to an aspect of a paper sheet handling apparatus disclosed in the present application, it is possible to easily perform maintenance or replacement in units of an image sensor unit. Thus, it is possible to reduce the cost of the maintenance and the replacement.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A correction method of a paper sheet handling apparatus, the method comprising:
   correcting an output of an image sensor unit, from among image sensor units, based on correction information stored in a storage element of the image sensor unit that captures and discriminates a paper sheet, wherein
   the correcting includes
      a black correction indicating an offset correction performed during a non-lighting period of a light source of the image sensor unit, and
      a white correction indicating an output correction of each of image capturing elements, which is performed by using a reference output correcting medium corresponding to the paper sheet, during a lighting period of the light source of the image sensor unit, and
      a shading correction for making outputs of the image capturing elements even,
   wherein
      the shading correction is included in the white correction, as part of the white correction, and
      when a maintenance or replacement is performed on the image sensor unit, the maintenance or replacement is performed in units of a pair of image sensor units of the image sensor units, on which the black correction and the white correction are performed on shipping.

2. The correction method according to claim 1, further comprising:
   correcting, based on correction information stored in storage element of at least one sensor unit from among an ultraviolet sensor unit that discriminates a fluorescent component of the paper sheet and a magnetic sensor unit that discriminates a magnetic component of the paper sheet, an output of the at least one sensor unit.

* * * * *